(12) United States Patent
Gustafsson

(10) Patent No.: US 6,351,647 B1
(45) Date of Patent: Feb. 26, 2002

(54) LOCATION-DEPENDENT SERVICES IN A MOBILE COMMUNICATION SYSTEM

(75) Inventor: Patrik Gustafsson, Irving, TX (US)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/101,041

(22) PCT Filed: Oct. 24, 1997

(86) PCT No.: PCT/FI97/00646

§ 371 Date: Nov. 23, 1998

§ 102(e) Date: Nov. 23, 1998

(87) PCT Pub. No.: WO98/19479

PCT Pub. Date: May 7, 1998

(30) Foreign Application Priority Data

Oct. 30, 1996 (FI) .................................................. 964375

(51) Int. Cl.[7] .................................................. H04Q 7/20
(52) U.S. Cl. ...................... 455/466; 455/456; 455/414; 455/457
(58) Field of Search ................................. 455/414, 456, 455/466, 517, 550, 575, 432, 422, 403, 560, 561, 524, 525, 435, 434, 515

(56) References Cited

U.S. PATENT DOCUMENTS

| 5,131,020 A | | 7/1992 | Liebesny et al. ........... 455/422 |
|---|---|---|---|
| 5,353,332 A | * | 10/1994 | Raith et al. .................. 455/455 |
| 5,561,704 A | * | 10/1996 | Salimando ................... 455/456 |
| 5,579,535 A | * | 11/1996 | Orlen et al. ............. 455/456 X |
| 5,604,765 A | * | 2/1997 | Bruno et al. ................. 375/200 |
| 5,802,468 A | * | 9/1998 | Gallant et al. .......... 455/457 X |
| 5,930,699 A | * | 7/1999 | Bhatia ......................... 455/414 |
| 5,950,124 A | * | 9/1999 | Trompower et al. ........ 455/422 |
| 6,049,711 A | * | 4/2000 | Ben-Yehizkel et al. ..... 455/414 |
| 6,108,554 A | * | 8/2000 | Kawamoto ................... 455/456 |
| 6,256,498 B1 | * | 7/2001 | Ludwig .................. 455/557 X |

FOREIGN PATENT DOCUMENTS

| EP | 417 944 | 3/1991 |
|---|---|---|
| EP | 647 076 | 4/1995 |
| EP | 0 703 463 | 3/1996 |
| GB | 2 201 865 | 9/1988 |
| GB | 2 216 319 | 10/1989 |

* cited by examiner

Primary Examiner—Tracy Legree
(74) Attorney, Agent, or Firm—Pillsbury Winthrop LLP

(57) ABSTRACT

A mobile communication system arranged to broadcast information containing the specific geographic location of a base station. The information is broadcast on a broadcast channel of the base station to an associated mobile station. A mobile station user desiring to activate an application may activate the application by transmitting a service request from the mobile station to a service request center. Prior to transmission of the service request, the information containing the specific geographic location of the base station is attached to the service request permitting the application to be carried out based upon the specific geographic location.

18 Claims, 3 Drawing Sheets

LOCATION-DEPENDENT SERVICES IN A MOBILE COMMUNICATION SYSTEM

This application is the national phase of international application PCT/FI97/00646, filed Oct. 24, 1997 which designated the U.S.

FIELD OF INVENTION

The invention relates to a mobile communication system which is arranged to broadcast general information on a cell broadcast channel of a base station, and to a mobile station.

BACKGROUND ART

Various service announcements can be transmitted to mobile stations on the basis of a service request of a subscriber in mobile communication systems. Generally, these chargeable services are most often arranged to be provided from outside the actual mobile communication system. By making a call to a required service number, a mobile subscriber is able to order a selected service announcement to be delivered to the display of the mobile station, for example. Of these individual services e.g. weather forecast, traffic announcements, local news and other local services, such as taxi ordering and service station announcements and so on are services where the mobile subscriber selects the desired announcement on the basis of the geographical area. The mobile subscriber generally wishes to have the service announcement related to his/her current location which varies because of the mobile nature of the mobile subscriber.

In the new European digital GSM mobile communication system, it is also possible, in addition to speech and data connections established on normal traffic channels, to send short digital data messages, called short messages, in the control or signalling channels of the system along with the actual signalling. The GSM mobile network is connected to a separate short message service centre SMSC which thus establishes a connection between a specific short message network and the GSM network. The short message service centre SMSC located outside the mobile network transmits short messages to mobile subscribers and from a mobile subscriber (A subscriber) to another mobile subscriber (B subscriber) or to any unit capable of receiving short messages outside the mobile network. The subscriber inputs a short message to be sent by the keyboard of the mobile station or by a computer connected to the mobile station. The mobile station sends the short message on the control or signalling channel to the base station from which the short message is further transferred via the mobile switching centre to the short message service centre SMSC. The service centre SMSC forwards the short message to the short message network. Correspondingly, the short message service centre SMSC transmits mobile-terminating short messages on the control or signalling channel.

The short message facility has been utilized in services provided for mobile subscribers. One short message service is the sea weather forecast service maintained by the Meteorological Office in Finland. A mobile subscriber makes a call to the telephone number of the sea weather forecast and indicates the geographical area from which the weather information is wished to be known. The subscriber interrupts the connection to the service number and after a while receives the required weather information as a short message which is displayed on the display of the mobile station. As weather information is permanently associated with a geographical area, in the sea weather forecast service the Finnish sea area is divided into eleven areas from which the subscriber can select the desired one by dialling the telephone number of the respective area. A problem with the above-described selection of the geographical area of the service is that the geographical areas are rather large in order to avoid a too long selection list, wherefore the service announcement has to be formed to be general to cover the whole selected large geographical area. In some services, such as in the short message service informing of traffic jams, in order that the service announcement is useful, it is required that the service can be focused accurately to the rather small geographical area requested by the subscriber. Furthermore, the problem with the prior art short message service described above is that the subscriber is not able to request the service without setting up a mobile speech connection on a normal traffic channel for making it possible to inform the subscriber in real time of the selection alternatives of the geographical area.

FIG. 1 shows a simplified block diagram of the pan-European GSM mobile communication system. The mobile station MS is connected via the radio path to one of base transceiver stations BTS, such as the base station BTS1 in FIG. 1. The base station system BSS comprises a base station controller BSC and base stations BTS controlled by the BSC. Usually several base station controllers BSC are controlled by a mobile services switching centre MSC. The mobile services switching centre MSC is connected to other mobile services switching centres. Via a gateway mobile services switching centre (GMSC) the GSM is connected to other networks, such as the public switched telephone network PSTN, to a public land mobile network PLMN, to an integrated services data network ISDN or to a service centre SC, such as the short message service centre SMSC. The operation and maintenance centre OMC monitors the operation of the whole system. The subscriber data of the mobile station MS is stored permanently into a home location register HLR and temporarily into a visitor location register VLR in the area of which the mobile station MS is located at the time. The location information of the mobile station MS is stored into the visitor location register VLR at the accuracy of the location area LA. The geographical area monitored by the visitor location register is divided into one or more location areas LA. One or more base stations BTS can operate in each location area.

The base stations BTS continuously broadcast information on a broadcast channel about themselves and their environment, such as a base station identity code BSIC, adjacent cell information and a location area identifier LAI broadcast on a paging channel. The cell broadcast centre situated at the base station controller BSC, for example. manages the messages of the cell broadcast channels of the base stations BTS. The cell broadcast centre transmits via the base station controller BSC the broadcast messages assigned for each individual base station BTS on the basis of initial information supplied by the operator. The broadcast on paging channels and cell broadcast channels, for example, has no address nor is encrypted but intended to be received by all mobile stations MS within the geographical area covered by the transmission of the base station. For a more detailed description of cell broadcast, reference is made to GSM recommendation GSM 03.41 "European digital cellular telecommunication system (Phase 2); Technical realization of Short Message Service Cell Broadcast (SMSCB)".

FIG. 2 shows a signalling diagram of a prior art transfer of a short message from a short message service centre SMSC to a mobile station. The SMSC sends a short message to the GMSC of the GSM network via a transit network, when required (message 1). The GMSC inquires the location of the mobile station from the home location register HLR of B subscriber (message 2). In message 3, the HLR returns to the GMSC information indicating the visitor location register VLR in whose area the mobile station of B subscriber is situated. The GMSC sends a short message further to an MSC according to the address of the VLR (message 4). When the short message is received by the MSC, the MSC inquires by message 5 from the VLR routing information for the short message. The VLR responds to the inquiry by sending to the MSC routing instructions for the location area LA indicated by stored location information of the mobile station of B subscriber (message 6). The MSC sends a short message to the mobile station MS of B subscriber via the base station controller BSC and the base station BTS (message 7). The short message travels transparently through the mobile network from the SMSC to the mobile station MS.

FIG. 3 shows a signalling diagram of a prior art transfer of a short message in the opposite direction, that is, from the mobile station MS to the short message service centre SMSC. In message 31 the mobile station MS sends a connection request to the base station BTS, and after having received a response, sends a short message via the base station BTS and the base station controller BSC to the MSC (message 32). In message 33 the MSC sends a short message to the gateway MSC which forwards the short message via the transfer network, when required, to the SMSC (message 34). From the SMSC the short message is delivered to the addressed receiver.

BRIEF DESCRIPTION OF INVENTION

An object of the present invention is to provide universally intelligible location information in a mobile communication system for use as a parameter for an application dependent on the geographical area.

This new way of providing location information for an application is attained with the method comprising a step of receiving a broadcast signal on a cell broadcast channel of a base station by a mobile station. The method is characterized by the steps of broadcasting location information identifying the geographical location on the cell broadcast channel of the base station, and utilizing this location information in an application dependent on the geographical location.

The invention further relates to a mobile communication system where a base station is arranged to broadcast general information on a cell broadcast channel and a mobile station is arranged to receive on a cell broadcast channel of a base station. The system is characterized in that the mobile communication system is arranged to broadcast location information identifying the geographical location on the cell broadcast channel of the base station, and to utilize this location information in an application dependent on the geographical location.

The invention further relates to a base station comprising at least one cell broadcast channel for broadcasting general information to mobile stations within a coverage area of the base station. The base station is characterized in that the base station is arranged to broadcast on the cell broadcast channel location information identifying the geographical location.

The invention is based on the idea that the base stations broadcast continuously on their cell broadcast channel location information which is received by the mobile station and utilized in an application dependent on the geographical location.

The base station of the invention broadcasts on the cell broadcast channel location information, such as the co-ordinates and place name of the base station site. The mobile station of the invention receives a broadcast and picks the location information from the transmission. The location information is then used as a parameter in an application which is dependent on the geographical location. In a preferred embodiment of the invention, when the mobile subscriber wishes to request a service which is dependent on the geographical area, such as a service announcement from a service unit of the public switched telephone network, for example, the mobile subscriber provides a service request, in the form of a short message, for example, and attaches the picked location information to this service request. The mobile station sends a service request via the mobile network to the service unit, such as a short message to the short message service centre from which the short message is forwarded to the required service provider. On the basis of the location information included in the service request, the unit providing the service selects the service requested by the subscriber, such as a service announcement, and sends this service announcement to the mobile subscriber to the mobile network, such as a short message via the short message service centre.

An advantage of the mobile communication system is that the location information to be processed is already in an universally intelligible format.

A further advantage of the mobile system of the invention is that the mobile subscriber need not determine the geographical area he/she is located in when ordering the service.

Still another advantage of the mobile communication system of the invention is that the service request can be sent in a short message, for example, as the delivery of the request does not require transmissions in two directions.

Furthermore, the mobile communication system provides the advantage that it will be easier and faster to request services dependent on the geographical location, such as service announcements, in comparison with a prior art implementation.

An advantage of the method of the invention is that a service announcement can be made to cover only a small geographical area.

BRIEF DESCRIPTION OF FIGURES

The invention will be explained now in more detail in connection with preferred embodiments, with reference to the appended drawings, wherein.

DETAILED DESCRIPTION OF INVENTION

Figure 1:
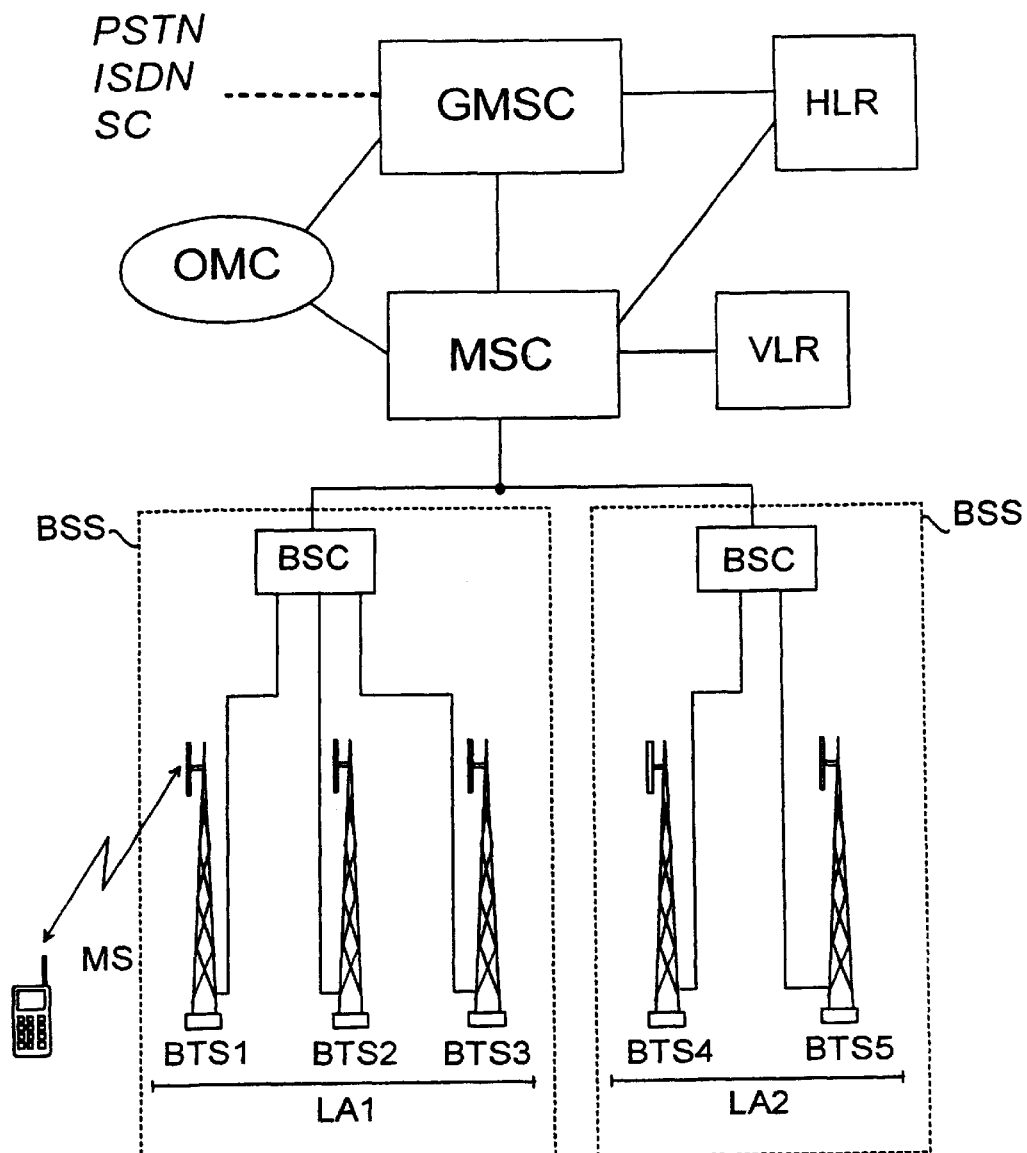
FIG. 1 shows a block diagram of a mobile communication system.

The present invention can be applied in connection with any mobile communication system. Below the invention is explained in more detail in connection with the pan-European GSM mobile communication system. FIG. 1 shows a simplified structure of the GSM mobile communication system explained above. The service centre SC shown in FIG. 1 can be a general purpose short message service centre. For a more detailed description of the GSM system, reference is made to GSM recommendations and to *The GSM System for Mobile Communications,* M. Mouly & M. Pautet, Palaiseau, France, ISBN:2-9507190-0-7.

In this application, the concept 'plain language location information' refers to universally intelligible location information which does not require a separate interpretation key or decoding table, for example. The understanding and utilization of this plain language location information are not intended to be restricted within the mobile communication system but may be universally utilized by any external system or device.

Figure 4:
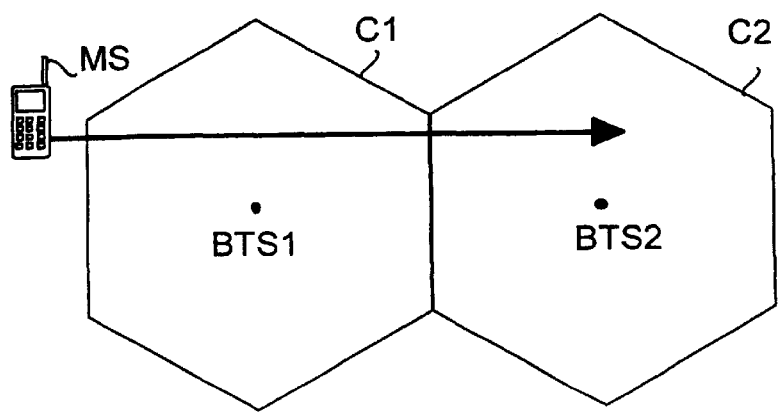
FIG. 4 illustrates service announcement request cases when the mobile station moves in the cellular network area.

In the following, the invention is explained in more detail in the light of the preferred embodiment of the invention with reference to FIG. 4. In the preferred embodiment of the invention, the service request from the mobile station MS is transmitted in the form of a short message. FIG. 4 shows an example of the travel of the mobile station MS across the coverage areas of two base stations BTS1 and BTS2. The base stations BTS1 and BTS2 broadcast on their cell broadcast channel information intended to be received by all the mobile stations MS. In accordance with the present invention, the broadcasting contains location information. The base station BTS1 broadcasts plain language location information obtained from the cell broadcast centre, in this exemplary case the geographical co-ordinates 61,345.25,110 of the location of the base station BTS1 in the latitude.longitude format, for example.

The location information broadcast from the base stations BTS is controlled by the cell broadcast centre that commands the base stations to broadcast location information defined by the operator. It is also possible to arrange a connection from the cell broadcast centre to an operator's network planning system from which the required information is obtained for providing the location information of the invention for each base station BTS. The cell broadcast centre maintains the location information used by the base stations for broadcasting. The location information in the invention is specific for each cell, in which case each base station BTS embodying the inventive functionality broadcasts location information assigned to the specific base. The location information can be different for each base station, in which case each base station is instructed to broadcast its own specific location information This location information individual for each base station can be the coordinate information of a base station location or of the geographical centre of a cell, such as 61,345.25,110 where the location is given in the latitude.longitude format, or similarly, a co-ordinate presentation as in some other co-ordinate system in a suitable format, or the name of the base station location, such as etelä-satama.helsinki.uusimaa.finland where the location name is given in the accurate_location information.town.country format. The individual base station specific location information can also be formed as a suitable combination of the examples mentioned above. The location information according to the invention can also be can be arranged so that the base stations situated at a specific area have the same location information. Then all the base stations situated at the specified location information area broadcast this same location information on their cell broadcast channel. The location information covering the area can be e.g. the co-ordinates of the geographical centre of the area presented in a suitable co-ordinate system and in a suitable format, or the geographical name of the geographical centre of the area, as in the format presented above in connection with the name of the base station location, the name of the area, such as helsinki.finland, in which case the name of the area is given in the town.country format. The location information of the area can also be some suitable combination of the above, for example.

When the mobile station MS moves in the area C1 of the base station BTS1 shown in FIG. 4, it receives and demodulates the signal on the cell broadcast channel of the base station BTS1. In accordance with the invention, the mobile station MS picks from the message the location information which in the case of this example is 61,345.25,110 and stores it automatically to a memory location arranged for this purpose.

Furthermore, when the mobile subscriber is within the coverage area of the base station BTS1, the mobile subscriber decides to order some service announcement, such as a local traffic announcement. The mobile subscriber starts to form a short message for providing a service request dependent on the geographical area. The body of the service request is formed in the mobile station MS as in prior art. In accordance with the present invention, the mobile station MS retrieves from the location information memory location the last stored location information 61,345.25,110 which is substantially in the same format as on the cell broadcast channel of the base station. The location information 61,345.25,110 is attached in the short message to the service request body without changing the presentation of the location information. The mobile station MS sends the service request provided in this way as a short message to the base station BTS1 that further transmits the short message to the service provider identified by the receiver's telephone number via a mobile network, possibly via a transit network and a short message service centre SMSC.

Figure 2:
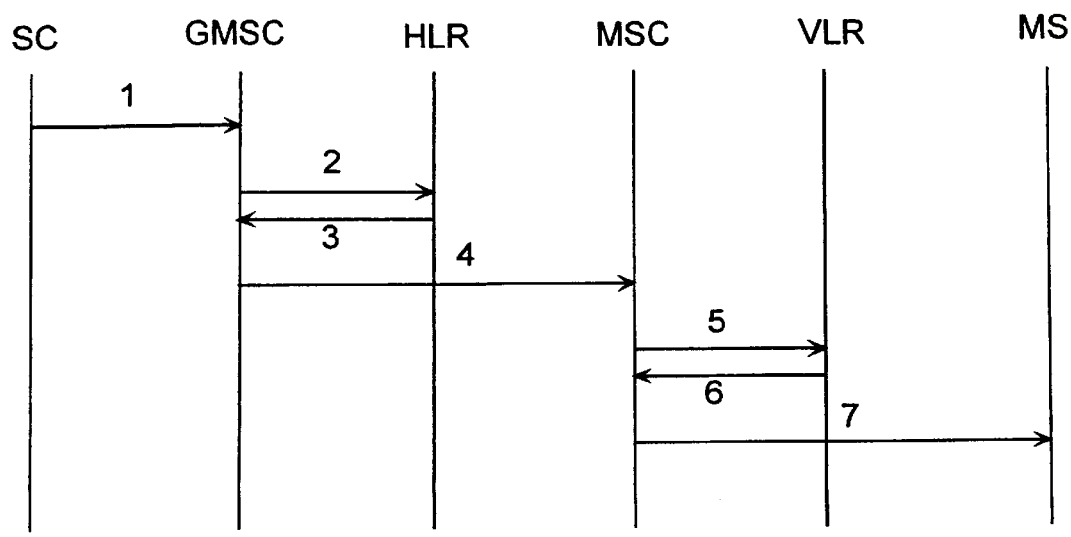
FIG. 2 shows a signalling diagram of a transfer of a short message from a short message service centre to a mobile station.

In the unit providing the service a service request short message is received and the service announcement requested by the subscriber is selected on the basis of the location information included in the service request. As the location information included in the service request is in plain language, the service unit does not need a separate code key or a conversion table or the like to understand and utilize the location information. The service unit sends the selected service announcement to the subscriber in the mobile network as a short message, a data transmission or in any suitable form, for example. It is not essential for the invention in which form the service announcement is in the end delivered to the mobile subscriber. The traffic announcement covering the location 61,345.25,110, delivered as a short message is transmitted to the mobile subscriber in the manner explained in connection with FIG. 2 above.

When the mobile station MS moves to the area C2 of the base station BTS2 shown in FIG. 4, it starts at the same time to receive on the cell broadcast channel of the base station BTS2. Similarly as explained in the case of BTS1, the location information indicated by the cell broadcast centre is broadcast on the cell broadcast channel of the base station BTS2. In this exemplary case, the location information of the base station BTS2 is 61,345.25,230. The mobile station MS receives this broadcasting and picks from the message the location information 61,345.25,230 and stores the information to the memory location reserved for this purpose in place of the previous location information 61,345.25,110.

When the mobile subscriber is within the coverage area of the base station BTS2, the mobile subscriber decides to order again a service announcement dependent on the geographical area, this time a local weather forecast, for example. The service request as a short message is provided as explained above in connection with a service request provided in the area of the base station BTS1. The information 61,345.25,230 about the location information memory location is attached to the service request without changing the presentation. The service request is sent and transmitted to the service provider as explained above. The service unit selects the service announcement required by the subscriber on the basis of the location information attached to the service request and delivers a weather forecast covering the location 61,345.25,230 to the mobile subscriber as shown above.

As can be seen from the above, the mobile station MS receives only on one cell broadcast channel of the base station at a time so that the location information of the area where the mobile station is situated and thus the activity of the invention is also unambiguous when the mobile station MS is situated in the overlapping coverage area of two or more base stations BTS.

Figure 3:
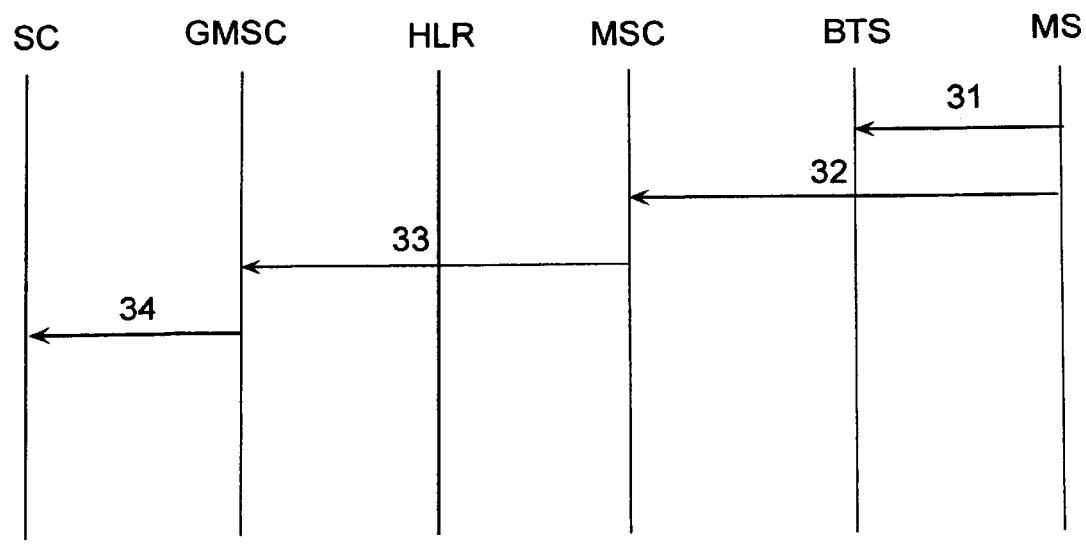
FIG. 3 shows a signalling diagram illustrating a transfer of a short message from a mobile station to a short message service centre.
Figure 5:
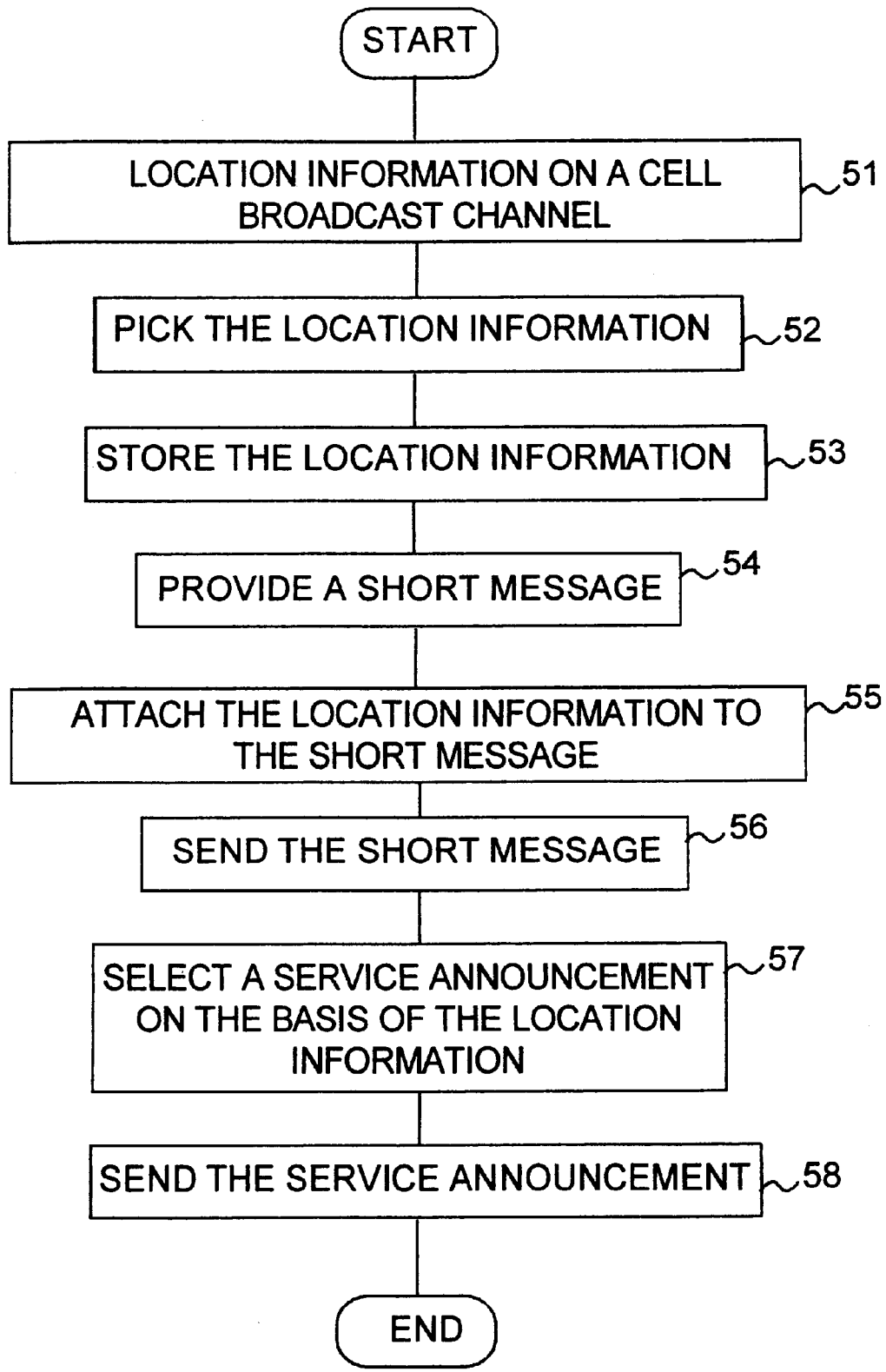
FIG. 5 shows a flow diagram of a preferred embodiment of the method according the invention.

FIG. 5 shows a flow diagram of a preferred embodiment of the method of the invention. In step 51, the base station, such as BTS1, broadcasts location information on its cell broadcast channel as explained above. In step 52 the mobile station MS picks this location information from the broadcasting received by it. The mobile station MS or a computer possibly connected to the mobile station MS stores the location information to a memory location especially reserved for this purpose (step 53). When the subscriber wishes to have a service announcement dependent on the geographical area from the area the subscriber is situated at the moment, the subscriber starts to form a short message in the mobile station MS (step 54). In step 55 the location information retrieved from the memory location is attached to this short message, the presentation of which information is not substantially changed. In step 56 the mobile station MS sends the short message provided in this way to the base station BTS from which the short message is further transmitted via the base station controller BSC, the mobile services switching centre MSC and the gateway MSC to the short message service centre SMSC, as shown in FIG. 3, but differing from the prior art transmission of short messages to the effect that the location information as described in the invention is attached to the service request including the short message. The short message is transferred from the short message service centre SMSC further to the unit providing the service. In step 57 of FIG. 5 the unit providing the service selects a service announcement dependent on the geographical area on the basis of the location information delivered in the service request. In step 58 the unit providing the service sends the requested service announcement to the mobile station MS that ordered the service. The service announcement can also be delivered to the mobile station MS as a short message with an address or as a data transmission. The transmission of the short message included in the service announcement corresponds to the prior art transmission of a short message as explained earlier in connection with FIG. 2.

In another embodiment of the invention, the base stations broadcast location information of the invention on their cell broadcast channel and the mobile stations receive this transmission and pick the location information from the transmission as described in connection with the preferred embodiment above. In the secondary embodiment, several memory locations are reserved for the mobile station MS for storing location information. Some of the memory locations are reserved for automatic storing and some for storing at the mobile subscriber's command. The storing of location information can be arranged to the effect that the automatic storing is carried out when possible to a free memory location if the location information differs from the location information stored last. If no memory locations reserved for automatic storing is free, the new location information is stored in place of the memory location of the location information of the oldest storing. In this way there is always at least one location information in the memory of the mobile station MS and most often a list of the location information that the mobile station MS has last received from the broadcasting channels of the base stations. The storing of location information carried out at the mobile subscriber's command is started by the mobile subscriber from the keyboard of the mobile station, for example, when the subscriber wishes to store the location information of the location area to a permanent memory location for a possible later use. By means of storing carried out on the basis of the control of the mobile subscriber, the subscriber can store permanently into the location information memory location information about the locations from which the subscriber later wishes to order service announcements although the subscriber was not located in this location at the moment of ordering.

When the subscriber wishes to order a service announcement dependent on some geographical area, such as local news, the subscriber starts to form a short message for providing a service request. The location information stored in connection with the last automatic storing is attached to the body of the service request. The mobile subscriber may at this stage change the location information into some other location information, into one of the earlier stored location information or some of the location information directed by the subscriber to be stored, for example. The selection of the location information can be arranged in such a manner that the subscriber scans the location information stored earlier on the mobile station display and selects from them the required ones which are attached to the body of the service request instead of the first suggested location information. The mobile station MS sends the service request provided in this way in the same manner as explained in connection with the preferred embodiment. The selection and delivery of the service announcement to the mobile station are also carried out as explained above.

In a third embodiment of the invention the base stations BTS broadcast on their cell broadcast channel location information in accordance with the invention as was explained in connection with the preferred and secondary embodiment. When the mobile subscriber wishes to order a service dependent on the geographical location, the mobile subscriber starts to form a service request. The mobile station MS receives a signal of the cell broadcast channel of the base station BTS and demodulates it. The mobile station picks from the message the location information as described in the invention and attaches it to the provided service request without changing the presentation of the location information and without storing the location information temporarily. The mobile station MS sends a service request as a short message, for example, to the required unit providing the service in the same way as described above in connection with the preferred and secondary embodiments. The unit providing service selects the suitable service on the basis of the location information and delivers it to the mobile station MS in some manner suitable for the purpose.

In a fourth embodiment of the invention, the mobile station MS sends the service request as a data transmission.

This embodiment differs from the above preferred and secondary embodiments only in that the service request with the location information of the invention is provided in the mobile station MS in a form required by the data transmission. The transmission of the service request to the base station is carried out as a prior art data transmission from the mobile station to the base station At the beginning of the data transmission, the mobile station MS requests the base station of a traffic channel for the data transmission. The base station BTS assigns to the mobile station a free traffic channel on which the mobile station MS sends the service request. The service request delivered as a data transmission is transmitted to the unit providing the service that selects on the basis of the location information contained in the service request, the service announcement required by the mobile station. The selected service announcement can be delivered to the mobile station MS as a data transmission, for example by the provided data connection or as a short message at the end of the data connection.

The selection of a service announcement described above in connection with various embodiments in the unit providing the service on the basis of the attached location information can be arranged in a manner best suitable for each service. For example, in a microcell environment, it is not sensible to make a specific weather forecast for each cell area even if each base station had its specific individual location information. Then the local weather forecast delivered to the mobile station is selected in such a manner that the location notified by the location information is included in the area covered by the weather forecast. But the traffic announcement, for example, is preferably arranged to be covered by a rather small area. As a fast moving mobile subscriber may have already left the area indicated by the location information before the delivery of the service announcement, the traffic information of a small area can be delivered for the location information area of the service request and for the traffic information area surrounding this area, for example.

The base station of the present invention does not require great changes to the base station structure of the prior art. The base station of the invention is arranged to broadcast on its cell broadcast channel the location information indicated by the cell broadcast centre. The base station broadcasts the indicated location information until the cell broadcast centre notifies new location information is to be broadcast or directs the base station to stop broadcasting the location information.

The mobile station of the present invention can be implemented with small changes to the prior art mobile station which is capable of receiving the broadcasting broadcast by the base station and short messages or a data transmission and also of sending short messages or data transmission. The processing of short messages or data transmissions by the mobile station can also be accomplished by a computer connected to a prior art mobile station or a communicator which is a combination of a computer and a minicomputer, a so-called intelligent telephone. In that case the mobile station MS receives the broadcasting of the base station BTS and demodulates the received radio signal. The computer connected to the mobile station MS picks from the message the location information, stores it when necessary and attaches the location information to the service request provided by it. The mobile station MS sends the service request provided in this way via the base station BTS to the required receiver.

The drawing and the specification related thereto are only intended to illustrate the idea of the invention. In its details, the method and the mobile communication system of the invention can vary in the scope of the claims. Although the invention is above explained mostly in connection with the GSM system, it can also be used in other mobile communication systems, such as CDMA systems.

What is claimed is:

1. A method for providing location information for an application associated with a mobile communication system, the mobile communication system including at least one of a base station and a mobile station, the method comprising:

broadcasting a broadcast signal on a broadcast channel of the base station, the broadcast signal including location information identifying a specific geographic location of the base station;

receiving in the mobile station the broadcast signal including the specific geographic location of the base station; and utilizing the specific geographic location information in the application, so that the location of the mobile station is determined on the basis of the specific geographic location and sent in a service request message to a service unit which selects a service required by the mobile station as a response to the location information included in the service request message and provides the selected service of the mobile station.

2. A method for providing location information for an application associated with a mobile communication system, the mobile communication system including at least one of a base station and a mobile station, the method comprising:

broadcasting a broadcast signal on a broadcast channel of the base station, the broadcast signal including location information identifying a specific geographic location of the base station;

receiving in the mobile station the specific broadcast signal including the specific geographic location of the base station; and utilizing the specific geographic location information in the application, wherein the application is dependent on the specific geographic location, the utilizing comprising:

(i) providing a service request message containing the location information in the mobile station;

(ii) sending the service request message from the mobile station;

(iii) selecting a service required by the mobile station in a unit providing the service as a response to the location information included in the service request message; and (iv) providing the selected service for the mobile station.

3. A method for providing location information for an application associated with a mobile communication system, the mobile communication system including at least one of a base station and a mobile station, the method comprising:

broadcasting a broadcast signal on a cell broadcast channel of the base station, the broadcast signal including location information identifying a specific geographic location of the base station;

receiving in the mobile station the specific broadcast signal including the specific geographic location of the base station; and utilizing the specific geographic location information in the application, wherein the application is dependent on the specific geographic location, the utilizing comprising:

(i) providing a service request including the location information in the mobile station;

(ii) sending the service request from the mobile station, (iii) selecting a service announcement required by the mobile station in a unit providing the service as a response to the location information included in the service request; and sending the service announcement to the mobile station.

4. A method according to claim 3, wherein the providing further comprises:

picking the location information from a signal of the cell broadcast channel of the base station;

providing a service request in text format; and attaching the picked location information to the provided service request.

5. A method according to claim 4, wherein the picking further comprises:

separating the location information from the received signal of the cell broadcast channel; and storing the location information in the mobile station.

6. A method according to claim 3, wherein the sending a service request comprises sending the service request from the mobile station as a short message.

7. A method according to claim 3, wherein the sending a service request comprises sending the service request from the mobile station as a data transmission.

8. A mobile station comprising means for receiving a cell broadcast channel of a base station the mobile station further comprising means for picking location information identifying a specific geographic location from the cell broadcast channel of the base station and means for utilizing the location information in an application dependent on the geographic location so that the location of the mobile station is determined on the basis of the specific geographic location and sent in a service request message to a service unit which selects a service required by the mobile station as a response to the location information included in the service request message and provides the selected service for the mobile station.

9. A mobile station comprising:

means for receiving a cell broadcast channel of a base station;

means for picking location information identifying the geographic location from the cell broadcast of the base station;

means for utilizing the location information in an application dependent on the geographic location;

means for providing a service request in text format;

means for attaching the location information to the service request; and means for sending the service request.

10. A mobile station according to claim 9, wherein the means for picking the location information from the cell broadcast comprises:

location information identification means for separating location from a received broadcast signal; and at least memory location for storing the location information.

11. A mobile station according to claim 10, wherein the mobile station comprises:

at least one memory location for storing the location information automatically; and at least one memory location for storing the location information permanently on the basis of the command given by the mobile subscriber.

12. A mobile station according to claim 9, wherein the means for attaching the location information to the service request comprise a computer or an intelligent part connected to the mobile station.

13. A mobile communication system including (i) a base station arranged to broadcast general information on a cell broadcast channel and (ii) a mobile station arranged to receive on the cell broadcast channel of the base station, wherein the mobile communication system comprises:

means for broadcasting information identifying a specific geographic location on the cell broadcast channel of the base station; and means for utilizing this location information in an application dependent on the specific geographic location so that the location of the mobile station is determined on the basis of the specific geographic location and sent in a service request message to a service unit which selects a service required by the mobile station as a response to the location information included in the service request message and provides the selected service for the mobile station.

14. A mobile communication system comprising:

a base station arranged to broadcast general information on a cell broadcast channel, the general information including location information identifying the geographic location on the cell broadcast channel of the base station; and a mobile station arranged to receive on a cell broadcast channel of the base station;

wherein the mobile station is further arranged to utilize the location information in an application dependent on the geographic location by providing a service request comprising location information of the mobile station, and transmitting the service request containing the attached location information from the mobile station to a unit providing the requested service; and wherein the unit providing the requested service is arranged to transmit to the mobile station a service selected on the basis of the location information.

15. A mobile communication system according to claim 14, wherein the location information broadcast by the base station is responsive to being controlled by a cell broadcast centre.

16. A mobile communication system according to claim 14, wherein the service request is in the form of a short message.

17. A mobile communication system according to claim 14 or 15, wherein the service request is in the form of a data transmission.

18. A mobile station comprising:

means for receiving a cell broadcast channel of a base station;

means for picking location information identifying the geographic location from the cell broadcast of the base station;

means for utilizing the location information in an application dependent on the geographic location of the mobile station;

means for providing a service request containing the geographic location of the mobile station; and means for sending the service request to a service unit on a network side in order to obtain a location-dependent service.

* * * * *